United States Patent [19]

Gardner et al.

[11] Patent Number: 4,649,178

[45] Date of Patent: Mar. 10, 1987

[54] PROCESS FOR PRODUCING BROMINATED BUTYL RUBBER HIGH IN PRIMARY ALLYLIC BROMINE

[75] Inventors: Irwin J. Gardner, Scotch Plains; James V. Fusco, Red Bank, both of N.J.

[73] Assignee: Exxon Research & Engineering Co., Florham Park, N.J.

[21] Appl. No.: 656,667

[22] Filed: Oct. 1, 1984

[51] Int. Cl.$^4$ .............................................. C08F 8/20
[52] U.S. Cl. .............................. 525/306; 525/332.8; 525/333.1
[58] Field of Search .......................................... 525/356

[56] References Cited

U.S. PATENT DOCUMENTS

| | | | |
|---|---|---|---|
| 2,955,103 | 10/1960 | Baldwin et al. | 525/356 |
| 2,962,482 | 11/1960 | Cottle et al. | 525/356 |
| 3,009,904 | 11/1961 | Serniuk et al. | 525/356 |
| 3,293,226 | 12/1966 | Schrijver | 525/356 |

FOREIGN PATENT DOCUMENTS 137308 8/1979 Fed. Rep. of Germany.

Primary Examiner—Joseph L. Schofer
Assistant Examiner—Bernard Lipman

[57] ABSTRACT

A process for preparing a brominated butyl rubber high in Primary Allylic Bromine which comprises reacting the rubber in solution with elemental bromine at a temperature of about 65° C. to about 130° C. The process is preferably carried out under substantially anhydrous conditions.

11 Claims, 1 Drawing Figure

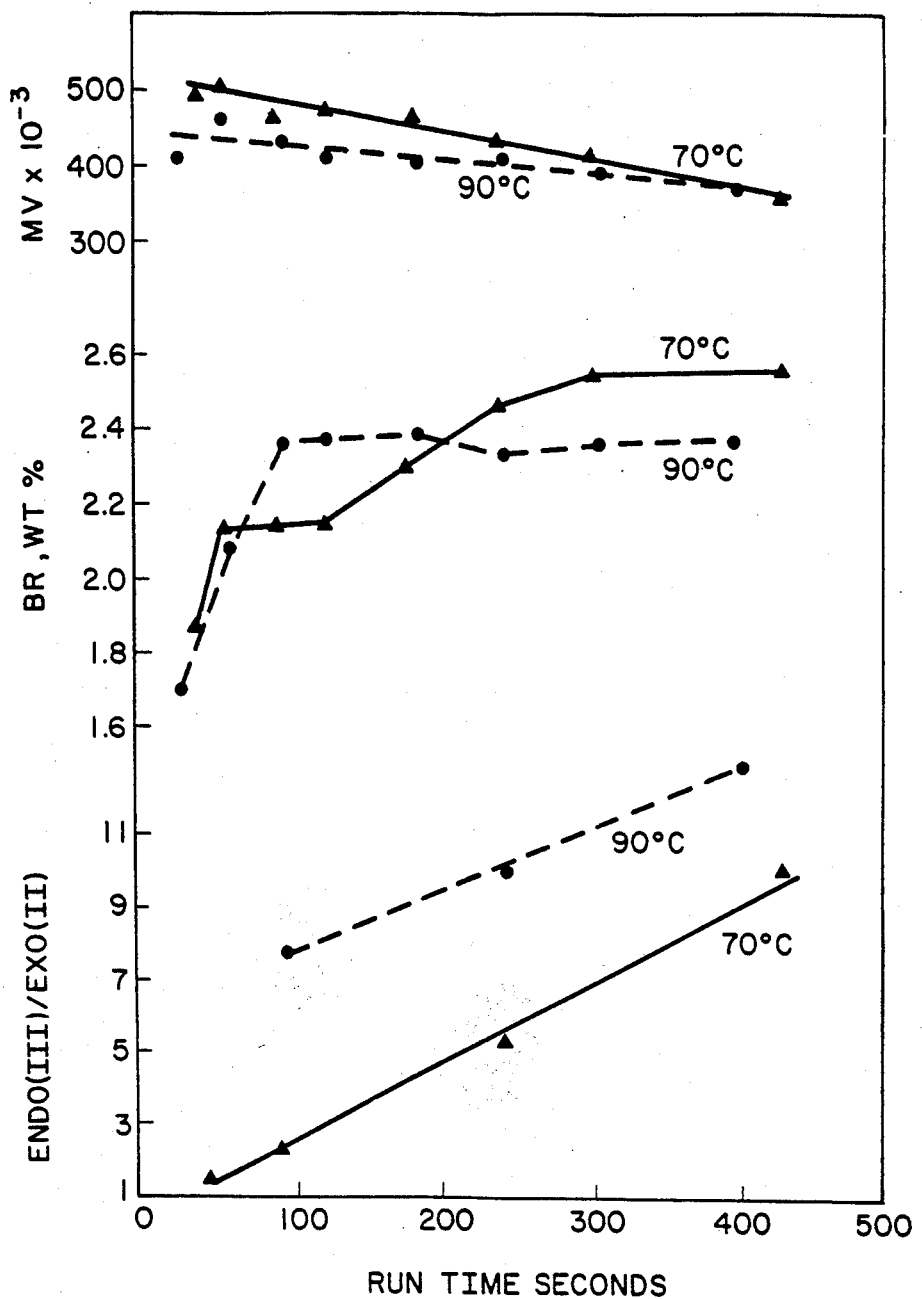

PROCESS FOR PRODUCING BROMINATED BUTYL RUBBER HIGH IN PRIMARY ALLYLIC BROMINE

BACKGROUND OF THE INVENTION

One of the first olefinically unsaturated synthetic elastomers to be commercially produced was butyl rubber. The expression "butyl rubber" is used in the rubber industry to describe copolymers made from a polymerization reaction mixture having therein from 70 to 99.5% by weight of an isoolefin which has about 4 to 7 carbon atoms, e.g. isobutylene, and about 30 to 0.5% by weight of a conjugated multiolefin having from 4 to 14 carbon atoms, e.g. isoprene. The resulting copolymers contain 85 to 99.5% by weight combined isoolefin and about 0.5 to about 15% combined multiolefin.

The preparation of butyl rubber is described in U.S. Pat. No. 2,356,128, which is incorporated herein by reference. Butyl rubber generally has a number average molecular weight of about 5,000 to about 500,000, preferably 80,000 to 250,000 and a Wijs Iodine No. of about 0.5 to 50 preferably 1 to 15. Low molecular weight butyl rubber is generally defined as having a $M_v$ of 5,000 to 30,000 and 2-10 mole % unsaturation. The viscosity average molecular weight ($M_v$) of commercial butyl rubber is about 100,000 to about 500,000, preferably about 250,000 to 500,000.

The polymer backbone of commercial butyl rubber is made up primarily of isobutylene units, with just a few percent isoprene units. The isoprene units contribute the small amount of unsaturation present in butyl rubber. The basic preparative equations are represented by:

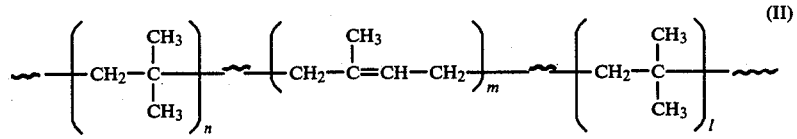

which combine to form its main structure:

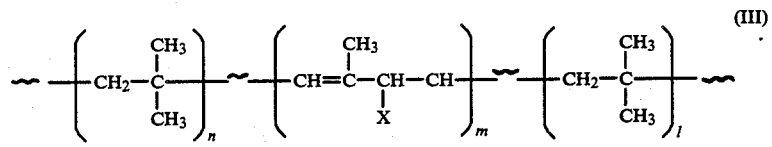

wherein n+1 represents the number of isoolefin units incorporated in the butyl rubber, while m represents the number of diolefin units present, substantially as isolated units. The conjugated diolefin loses its diene unsaturation upon its incorporation into the polymer backbone.

Thus butyl rubber, as presently produced, contains only a small percentage of unsaturation, in the form of the monoolefin structure associated with the isoprene residue which is incorporated more or less randomly throughout the polymer chain.

The reactivity of the butyl rubbers and consequently their cure rate is substantially less than the high unsaturation natural and synthetic rubbers. In an effort to improve cure characteristics of the butyl rubbers, these synthetic polymers have been halogenated. Halogenated butyl rubber has contributed significantly to the elastomer industry. A method of preparing halogenated butyl rubber is described in U.S. Pat. No. 3,099,644 which is incorporated herein by reference. Both chlorinated and brominated butyl rubbers are known in the art. The structural formula for halogenated butyl rubber can be represented as being:

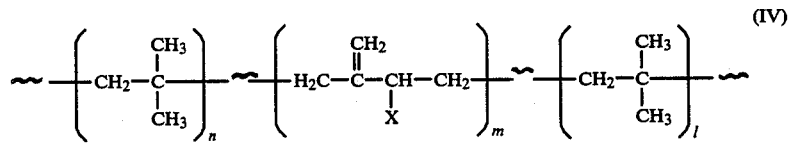

where X represents the halogen and n, l and m have the same values as described above for butyl rubber. This structure, however, is one of several which can be formed, depending on the conditions of halogenation, the halogenating agent, used etc. The primary structural configurations generally found in halogenated butyl rubbers are

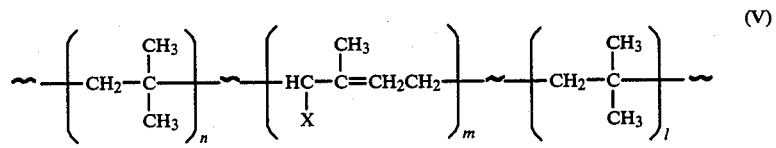

Other structural configurations which may occur are:

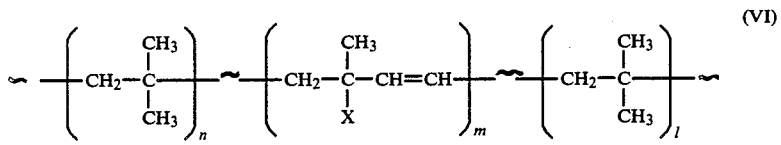

It will be noted that in each case the halogen is present as a secondary or tertiary allylic halogen.

Methods for the halogenation of butyl rubber are well known in the art. U.S. Pat. No. 2,631,984 discloses various techniques for the bromination of butyl rubber. Where solid brominating agents such as N-bromine succinimide is utilized in the solid phase bromination of butyl rubber the mill temperature can be as high as 145° C. However, the solution bromination utilizing bromine as the brominating agent is disclosed as being carried out in ethyl chloride at temperatures at which ethyl chloride (b.p. 12.5° C.) is a liquid.

U.S. Pat. No. 2,732,354 discloses a method for the chlorination of butyl rubber using a chlorinating agent at a temperature below 0° C., e.g., 31 20° C. to about −65° C.

U.S. Pat. No. 2,965,620 discloses a process for the preparation of halogenated butyl rubber by adding a minor amount of water to a butyl rubber solution in order to produce a suspension of the butyl rubber solution and halogenating the rubber. While a broad temperature range of 0° C. to 30 150° C. is disclosed for the reaction, the preferred temperature range is disclosed to be 20° C. to 50° C. The examples disclose bromination carried out at room temperature to about 80° C. U.S. Pat. No. 2,965,621 discloses a similar process wherein metal salts are dissolved in the water. While similar temperatures are disclosed for the halogenation process, the examples were all conducted at room temperature.

U.S. Pat. No. 3,009,904 discloses a method for preparing a chlorinated/brominated butyl rubber which comprises reacting a solution of the rubber, sequentially, first with chlorine, then with bromine. While broad disclosures of useful temperatures are made, e.g., 0° to 200° C., the preferred range of reaction temperatures is taught to be 20° C. to 50° C. In fact all of the examples show the bromination of a previously chlorinated butyl rubber at room temperature.

A process for the chlorination of butyl rubber dissolved in an inert solvent is disclosed in U.S. Pat. 2,964,489. The reaction temperature range is taught to be 0° C. to about +100° C. preferably 10° C. to 80° C. The more preferred and claimed range, is disclosed to be 20° C. to 70° C. The examples, however, were conducted at about 30° C.

U.S. Pat. No. 3,099,644 discloses a continuous chlorination process which is disclosed to be operable at about 0° to 100° C., preferably at about 20° C. to 80° C. While bromination is alluded to, no conditions for the bromination is taught.

British Patent Specification No. 1,008,656 published Nov. 3, 1965 discloses that where elemental bromine is used to prepare brominated butyl rubber the reaction must be carried out below 0° C. An improved bromination process is taught using brominated aliphaticdiamine as the brominating agent at temperatures of less than 50° C. The art has not generally recognized any advantage to carrying out the bromination reaction at any particular temperature.

More recently, U.S. Pat. No. 4,288,575 to Irwin Gardner (which has an effective filing date of Mar. 7, 1977) discloses a new structural configuration for the halogenated rubber where the rubber contains conjugated diene which is represented as

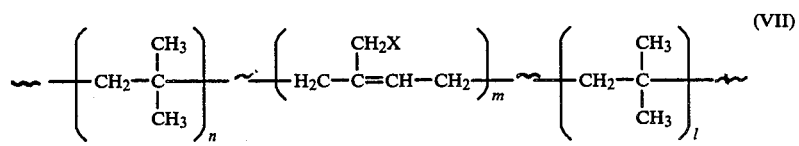

In this structure the halogen, X, is in a primary allylic position. The method disclosed in U.S. Pat. No. 4,288,575 for preparing these rubbers involves the use of a copper oxide catalyst useful for dehydrohalogenation of butyl rubber to form a conjugated diene rubber.

As shown in Example 6 of the Gardner U.S. Pat. No. 4,288,575 this primary halogen is in a more stable configuration than the secondary halogens of the prior art and is not readily removed. The copper oxide catalyst was taught in Gardner's earlier U.S. Pat. No. 4,145,492 to be a dehydrohalogenation catalyst suitable for the preparation of conjugated diene rubber. Where Gardner produces polymers containing the structure of Formula V that structure is invariably associated with conjugated diene.

Table I of U.S. Pat. No. 4,288,575 shows various halogenated conjugated diene-containing polymers which are shown to have the halogen in the primary position. Not surprisingly, the residual halogen is always associated with substantial amounts of conjugated diene. Since the catalyst is a dehydrohalogenation catalyst, dehydrohalogenation is proportional to the degree of contact of polymer with the catalyst, and similarly, the degree of rearrangement of halogen from the secondary to the primary position is related to the degree of dehydrohalogenation.

Where high amounts of residual halogen are present in the polymer, as in Run A of Table I of U.S. Pat. No. 4,288,575, it is the result of an initially high level of halogenation; here 1.95 wt. % bromine. Since the degree of rearrangement is proportional to the degree of dehydrohalogenation Gardner's polymers cannot be low in conjugated diene and at the same time have appreciable amounts of halogen present in the primary allylic position.

In 1979 Van Tongerloo et al. disclosed a brominated butyl rubber which was low in conjugated diene content (if any) and had the primary halogen configuration. The polymer is represented as having the structure

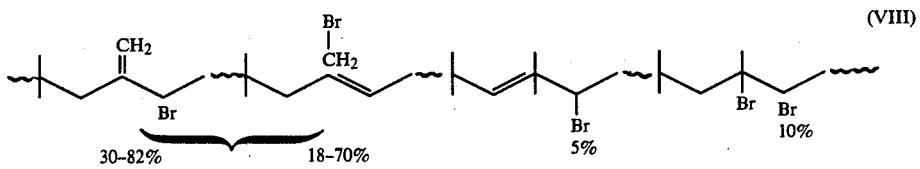

The reference states that the polymer was produced by a proprietary method and Van Tongerloo et. al. disclose only that rearrangement to the more stable primary configuration can be accomplished in brominated butyl rubber "under a variety of conditions—for example, in the presence of acid, free radicals, bases or heat." See Van Tongerloo, A. and Vukov, R., *Proceedings, International Rubber Conference*, Milan, Italy, 1979, p.70ff. The skilled chemist will recognize that this gratuitous disclosure represents the techniques which can be enumerated to accomplish an infinite number of reactions. The disclosure in no way teaches any method to prepare the polymer disclosed.

Van Tongerloo et. al. designate brominated butyl rubber having the secondary allylic bromine associated with the methylene configuration of Formula VIII above as "EXO" and the primary bromo configuration of Formula VII as "ENDO". It is alleged that even at ratios of ENDO:EXO of 71:16 there is no clear indication of a correlation between vulcanizate properties and polymer microstructure. Hence, Van Tongerloo et. al. have not appreciated that the polymer, which they purportedly made by an undisclosed proprietary process, has any properties which are different than those of conventional halogenated butyl rubber.

In a later paper Vukov disclosed that certain model compounds can be heated to 150° C. for 30 minutes to accomplish a molecular rearrangement as follows:

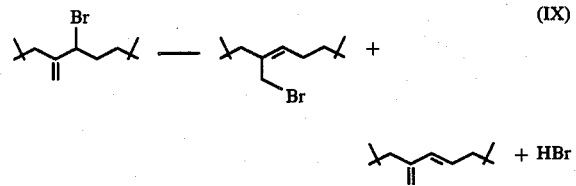

No substantial rearrangement of the chlorinated model was observed. See Vukov, R., "Halogenation of Butyl Rubber and The Zinc Oxide Cross-Linking Chemistry of Halogenated Derivatives" which was presented to the ACS Rubber Division on Oct. 25, 1983. Those skilled in the art will recognize that what is true about simple molecules (model compounds) may not necessarily be true about complex polymer molecules.

While the art generally teaches a broad temperature range for the production of brominated butyl rubber in practice elevated temperatures are avoided by those skilled in the art. Commercially, bromination is carried out at room temperature. While occassional temperature excursions as high as 50°-55° C. occur they are avoided because they have been believed to result in poor quality product. Whenever the art has attempted to produce a brominated butyl rubber having a substantial fraction of its bromine in the primary allyic position, this result has been achieved by an isomerization reaction on previously brominated butyl rubber. No direct process for producing such a product has been disclosed or suggested in the art.

SUMMARY OF THE INVENTION

It has surprisingly been found that a brominated butyl rubber can be produced directly which contains a substantial fraction of the bromine in the primary allylic position. This result is achieved by conducting the bromination in solution utilizing as the brominating agent elemental bromine, the bromination being carried out at a temperature of about 65° C. to about 130° C.

BRIEF DESCRIPTION OF DRAWING

FIGURE-Graphical representation of Br content, Mv and ENDO/EXO RATIO with respect to reaction time.

DETAILED DESCRIPTION

This invention relates to a method for preparing brominated butyl rubber having a substantial fraction of the bromine in a primary allylic position. More particularly, it relates to a solution polymerization bromination method which produces the primary allylic bromine containing polymer directly.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85-99.5 wt% (preferably 95-99.5 wt%) of a $C_4$-$C_7$ isoolefin, such as isobutylene, and about 15-0.5 wt%, preferably about 5-0.5 wt%, of a multiolefin of about 4-14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608-609, etc. The term "butyl rubber" as used in the specification and claims includes the aforementioned copolymers of an isoolefin having 4-7 carbon atoms and about 0.5 to 20 wt% of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCL_3$, a relatively inexpensive Friedel-Crafts catalyst is soluble in it, as are the isobutylene and isoprene comonomers. Additionally, the butyl rubber polymer is insoluble in the methyl chloride and percipitates out of solution as fine particles. The polymerization is generally carried out at temperatures of about −90° C. to −100° C. See U.S. Pat. Nos. 2,356,128 and 2,356,129 incorporated herein by reference.

The polymerization process which is carried out in a draft tube reactor is continuous. Monomer feed and catalyst are continuously introduced at the bottom of the draft tube where an axial flow pump is located. The pump circulates the slurry at high velocity to provide efficient mixing and heat transfer. Polymer slurry containing about 20–30 wt% butyl rubber continuously overflows from the reactor through a transfer line.

Where the desired product is the butyl rubber itself, the slurry is fed through the transfer line to a flash drum operated at about 140–180 kPa (1.38–1.58 atm) and 65°–75° C. Steam and hot water are mixed with the slurry in a nozzle as it enters the drum to vaporize methyl chloride and unreacted monomers which pass overhead and are recovered, and the polymer is finished by water removal and drying. Where, however, it is desired to produce a halogenated butyl rubber it is necessary to prepare a solution of the rubber.

In the preferred method of halogenation a "solvent replacement" process is utilized. Cold butyl rubbber slurry in methyl chloride from the polymerization reactor is passed to an agitated solution in drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

Heretofore it has not been possible to prepare a brominated butyl rubber having a substantial fraction of the bromine in the primary allylic (Type III) configuration. The isoprene utilized in the manufacture of butyl rubber is generally incorporated into the rubber in the following configuration:

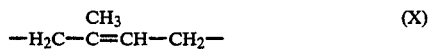
$$-H_2C-C(CH_3)=CH-CH_2- \quad (X)$$

the halogen is generally incorporated in a configuration depicted as

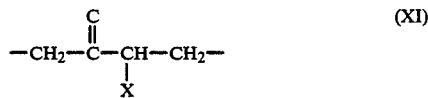
$$-CH_2-C(=C)-CH(X)-CH_2- \quad (XI)$$

wherein X is halogen. The site of unsaturation is external to the backbone of the polymer. In the butyl rubber polymers of this invention the halogen is incorporated in a structure having the configuration

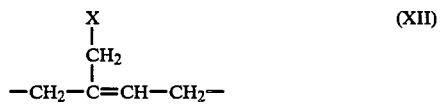
$$-CH_2-C(CH_2X)=CH-CH_2- \quad (XII)$$

Throughout the specification and claims the configurations of formulas X, XI and XII will be referred to as Type I, II and III configuration respectively.

In accordance with the present invention the bromination of the butyl rubber polymer is accomplished by contacting a predissolved polymer directly with bromine. Preferably the bromine is dissolved in a suitable solvent prior to contacting the dissolved butyl rubber. In a preferred embodiment the solvent for the bromine is the same solvent used to prepare the butyl rubber solution.

A critical aspect of this invention is the temperature at which the bromination is carried out. The bromination according to this invention is conducted at a temperature of about 65° C. to about 130° C., preferably about 70° C. to 120° C.; more preferably about 75° C. to 110° C.; most preferably about 85° C. to 95° C. for a few seconds to several hours. Ideally, the bromination reaction is carried out at about 70° C. to about 90° C. Preferably the bromination reaction is conducted by contacting the bromine with the dissolved butyl rubber for a few minutes, e.g. 1–2 minutes to about 60 minutes, preferably about 3 to about 10 minutes. An advantageous pressure range is from about 5 psig to about 200 psig. The lower pressure utilized is, preferably, sufficient to prevent boiling of the solvent at the reaction temperature.

The bromination conditions are regulated to brominate the butyl rubber to the extent of at least 0.5 wt% bromine, but not more than about three atoms of bromine combined in the polymer per two double bonds and preferably not more than about one atom of combined bromine per double bond in the polymer. In other words, the mole percent combined bromine should be about 0.20 to 1.0, preferably about 0.25 to 0.60 times the mole percent unsaturation of the polymer.

The butyl rubber or other rubbery isoolefin-multiolefin copolymers may be dissolved in any suitable substantially inert liquid organic solvent such as a substantially inert hydrocarbon or halogenated derivatives of substantially inert hydrocarbons; examples of which are hexane, heptane, pentane, naphtha, branched chain paraffins, straight run mineral spirits, cyclohexane, cyclopentane, alkyl substituted cycloparaffins, benzene, toluene, chlorobenzene, chloroform, trichloroethane, carbon tetrachloride, etc. The term "inert" as used in the specification and claims with respect to the solvent means solvents that will not react with the polymer nor be readily brominated under the conditions of bromination.

The preferred solvents are $C_3$ to $C_{22}$, preferably $C_5$ to $C_{15}$, and even more especially $C_7$ to $C_{12}$, substantially inert hydrocarbons such as cychlohexane, cyclopentane, methyl pentanes, dimethyl butanes, isopentanes, isoheptanes, methyl cyclopentane, toluene, and especially n-hexane, n-heptane, n-pentane, benzene, dodecane or admixtures thereof.

Typical mixtures of the foregoing hydrocarbon solvents are as follows:

| Mixture 1 | |
| --- | --- |
| Component: | Volume percent |
| 2-methyl pentane | 1.7 |
| 3-methyl pentane | 12.4 |
| n-Hexane | 55.4 |
| Methyl cyclopentane | 20.2 |
| Benzene | 7.9 |

-continued

| Mixture 1 | |
|---|---|
| Component: | Volume percent |
| Cyclohexane | 2.4 |
| | 100.0 |

| Mixture 2 | |
|---|---|
| Component: | Volume percent |
| 2,2-dimethyl butane | 0.1 |
| 2,3-dimethyl butane | 2.5 |
| 2-methyl pentane | 19.8 |
| 3-methyl pentane | 12.5 |
| n-Hexane | 34.3 |
| Methyl cyclopentane | 20.8 |
| 2,2-dimethyl pentane | 0.8 |
| Benzene | 7.5 |
| Cyclohexane | 1.7 |
| Total | 100.0 |

The concentration of the butyl rubbber in the solvent will depend upon the type of reactor, molecular weight of the butyl rubber, etc. In general, the concentration of a rubbery copolymer having a viscosity average molecular weight of about 50,000 to about 2,000,000, if the solvent is a substantially inert hydrocarbon, will be between 1 and 80% by weight, preferably about 5 to 50%.

In practicing the present invention, in batch procedure, the bromine is preferably added relatively slowly to a preformed solution of the butyl rubber with agitation, the solution being regulated to a temperature of between about 65° and 130° C. The bromine is advantageously added over a period of about 1 to 60 minutes depending upon the degree of agitation.

For a continuous process, the preformed butyl rubber solution and elemental bromine are preferably contacted in an orifice mixing zone or preferably a multiple orifice mixing zone of any commercially available type wherein the butyl solution passes consecutively through a plurality of orifices. The bromine is advantageously pumped into the butyl rubber solution at one or more points, however preferably at least at the first orifice passed through by the butyl solution.

Alternatively a plurality of agitated reaction zones in series may be employed wherein the bromine is added to the first zone or the process staged so as to increase the bromine content in each zone to the final bromine concentration desired. Alternatively the bromine may be introduced into the solution of the rubbery copolymer at one or a plurality of points at the suction end of a pumping means such as a centrifugal pump wherein complete mixing and substantially complete reaction of the bromine and the copolymer solution takes place.

In the preferred embodiment, of this invention the bromine is dissolved in a suitable solvent and introduced in the manner described for the bromine liquid. The concentration of bromine in solution can be about 1 to about 20 weight percent, more preferably about 5 to about 15 weight percent, e.g. 8-12 wight percent. The method of bromine addition is not critical.

Regardless of the type of bromination process, the amount of bromine added to a butyl rubber dissolved in a completely inert hydrocarbon is approximately twice that which is desired to be combined with the butyl polymer, since for one mole of bromine, approximately one atom combines with the polymer and the other atom is evolved as hydrogen bromide.

The resulting brominated butyl rubber polymer may be recovered in various manners. The polymer may be precipitated with alcohols or acetone or any other known non-solvent for the rubber and dried under about 1 to 760 millimeters or higher of mercury pressure absolute at temperature levels of between about 0° to 180° C., preferably about 50° to 150° C. (e.g. 70° C.). Other methods of recovering the brominated butyl polymer from the hydrocarbon solution of the same are by conventional spray or drum drying techniques. Alternatively the chlorinated butyl rubber containing solution may be contacted with steam and/or preferably injected into a vessel containing agitated water heated to a temperature sufficient to flash off the hydrocarbon solvent and form an aqueous slurry of the brominated butyl rubber. The brominated butyl rubber may then be separated from this slurry by filtration, dried and recovered as a "crumb" or as a dense sheet or slab by conventional milling and/or extruding procedures.

The polymers produced by the process of this invention have a mole ratio of Type II/Type III of less than 2/1, more preferably less than 1/1 most preferably less than ½.

The advantages of the instant invention may be more readily appreciated by reference to the following examples.

EXAMPLE I

A commercially available butyl rubber having a Mooney viscosity ($M_L1+8$, 125° C.) of 58 and 1.65 mole % unsaturation was used to prepare a butyl rubber cement comprising 15% by weight butyl rubber in an appropriate solvent. The cement was used in a series of bromination experiments at 70° C., 90° C., 110° C. and 130° C. Bromination was carried out using 3.5 grams of fresh bromine (equivalent to about 10% excess based on moles of unsaturation). The bromine was dissolved in 100 ml of solvent.

500 grams of cement was transferred to a 1000 ml. flask and the flask placed in a hot oil bath at the test temperature. While stirring with an electric stirrer 750 RPM the bromine solution was added to the cement. The flask was adapted with a dry ice condenser and $N_2$ bubbler. Samples were taken at 30 seconds, 1 minute, 120 seconds, 3 minutes, 4 minutes and 5 minutes. Samples were taken directly into a 250 ml flask containing ice, water 5 ml of 1% NaOH while stirring vigorously. After withdrawing the six samples the contents of the flask was transferred to a 2000 ml. beaker containing ice, water and 100 g of 10% NaOH. The experimental data appears in Table I. During the bromination dehydrohalogenation of the polymer occured resulting in sites of conjugated double bonds ("CD").

The mole fraction of each of Type I structure (unbrominated unsaturation), Type II structure EXO (secondary) allylic bromine and Type III structure ENDO (primary) allylic bromine was determined for the pot sample for each temperature. The results are shown in Table II.

TABLE II

| | Bromine Structure | | |
|---|---|---|---|
| Temp °C. | Structure Type (Mole Fraction) | | |
| | I | II | III |
| 70 | 0 | 0.08 | 0.91 |

TABLE II-continued

| | Bromine Structure | | |
|---|---|---|---|
| Temp | Structure Type (Mole Fraction) | | |
| °C. | I | II | III |
| 90 | <0.01 | 0.10 | 0.90 |
| 110 | 0.07 | 0.12 | 0.81 |
| 130 | 0.31 | 0.10 | 0.58 |

Polymer having a substantial fraction of the bromine in the Type III configuration is produced at each temperature; the best results are achieved at about 70° C. to about 90° C. A commercial butyl rubber will have typical mole fraction of Type I, II and III of about 0.25, 0.65 and 0.10 respectively. The Type III bromine can be as high as 0.15 mole fraction for commercial rubber. It is evident from the data that at least a part of the Type III bromine is formed directly with subsequent isomerization of the remaining Type II bromine. Furthermore, while the prior art teaches a maximum Type II/Type III mole factor 15:71 the process achieves substantially a greater mole fraction of Type III bromine.

EXAMPLE II

Example I was repeated at 70° C. and 90° C. and the samples were analyzed and determination made for wt% bromine, viscosity average molecular weight (Mv) and the fraction of Type II, Type III bromine. The FIGURE expresses the data graphically. It is noted that over the 450 second run the ratio of Type III/Type II increases while there is no substantial loss in molecular weight. The bromine content reaches a maximum value at 100 seconds for the 70° C. run and at about 240 seconds for the 90° C. run.

EXAMPLE III

A successful attempt was made to prepare a Type III rich brominated rubber on a large scale. A 100 gallon Pfaudler reactor was utilized for the run. A 10 wt% solution of a butyl rubber (Mooney $M_L 125$ (1+8) of 46–50 and mole 1.5 mole % unsaturation) was prepared in heptane. Cement comprising 39 lbs of rubber was charged to the reactor and heated to 70° C. While stirring sufficiently to produce a small vortex, 818 g of bromine in 600 ml of heptane was charged to the reactor in a few seconds. To stabilize the product calcium stearate and ESBO (epoxidized soybean oil was added). The polymer was recovered by acetone precipitation and steam stripping.

While a lower mole fraction of Type III was present compared to the small scale tests of Examples I and II, a substantial fraction of the bromine was in the type III configuration.

In carrying out the process of this invention it is preferred that substantially anhydrous conditions be used. As used in the specification and claims the term "substantially anhydrous" means that the polymer-solvent system contains less than 0.1 parts of water by weight based on the weight of the polymer, preferably less than 0.05 wt. %.

TABLE I

| | | BROMINATION OF BUTYL RUBBER[1] | | | | | | | | | | |
|---|---|---|---|---|---|---|---|---|---|---|---|---|
| Sample | Time | $Br_2$ (wt %) | | | | $Mv \times 10^{-3}$ | | | | CD (mole %) by U.V. | | |
| # | Sec | 70° C. | 90° C. | 110° C. | 130° C. | 70° C. | 90° C. | 110° C. | 130° C. | 70° C. | 90° C. | 110° C. |
| 130° C. | | | | | | | | | | | | |
| 1 | 30 | 1.86 | 1.70 | 1.60 | 1.39 | 485 | 413 | 340 | 358 | .161 | .195 | — | .368 |
| 2 | 60 | 2.13 | 2.08 | — | 1.44 | 497 | 464 | — | 380 | .183 | .292 | — | — |
| 3 | 120 | 2.15 | 2.37 | 1.68 | 1.39 | 458 | 405 | 293 | 358 | .212 | .400 | — | — |
| 4 | 180 | 2.30 | 2.37 | 1.69 | 1.36 | 471 | 401 | 277 | 326 | .224 | .399 | — | .424 |
| 5 | 240 | 2.46 | 2.33 | — | 1.34 | 461 | 405 | — | 327 | | .391 | — | — |
| 6 | 300 | 2.54 | 2.36 | 1.60 | 1.36 | 405 | 291 | 262 | 316 | — | .497 | — | — |
| POT | 450 | 2.56 | 2.37 | 1.68 | 1.22 | 360 | 368 | 277 | 382 | — | .495 | .534 | .433 |

[1]For runs at 70° C. and 90° C. heptane was used as the solvent. For runs at 110° C. and 130° C. Isopar G ®, a high boiling alkane isooctane process by product, was used as the solvent.

What is claimed is:

1. A process for preparing a brominated butyl rubber having a substantial fraction of incorporated bromine in a primary allylic configuration (type III) which comprises contacting a butyl rubber dissolved in a solvent with bromine at a reaction temperature of about 65° C. to about 130° C. for a time sufficient to brominate the polymer.

2. The process according to claim 1 wherein the solvent is heptane.

3. The process according to claim 1 wherein the bromine is dissolved in a solvent.

4. The process according to claim 3 wherein the solvent for the bromine is the same as the solvent for the butyl rubber.

5. The process according to claim 1 wherein the reaction temperature is about 70° to about 120° C.

6. The process according to claim 5 wherein the reaction temperature is about 75° to about 110° C.

7. The process according to claim 6 wherein the reaction temperature is about 85° C. to about 95° C.

8. The process according to claim 1 wherein the solvent is a substantially inert hydrocarbon solvent.

9. The process according to claim 8 wherein the hydrocarbon solvent is a $C_7$ to $C_{12}$ hydrocarbon.

10. The process according to claim 1 wherein the mole ratio of Type II to Type III bromine is less than 2/1.

11. The process according to claim 10 wherein the mole ratio is less than 1/1.

* * * * *